United States Patent [19]
Ito et al.

[11] Patent Number: 5,379,021
[45] Date of Patent: Jan. 3, 1995

[54] INDUCTIVE COUPLER FOR TRANSFERRING ELECTRICAL POWER

[75] Inventors: Makoto Ito; Yoichiro Kashiwagi; Goro Asahi, all of Kariya, Japan

[73] Assignee: Kabushiki Kaisha Toyoda Jidoshokki Seisakusho, Kariya, Japan

[21] Appl. No.: 164,421

[22] Filed: Dec. 9, 1993

[30] Foreign Application Priority Data

Dec. 11, 1992 [JP] Japan .................. 4-331612

[51] Int. Cl.6 .................. H01F 15/02; H01F 27/26
[52] U.S. Cl. ...................... 336/83; 336/92; 336/212; 336/DIG. 2
[58] Field of Search ............... 336/83, 90, 92, DIG. 2, 336/212, 66, 210; 320/2

[56] References Cited

U.S. PATENT DOCUMENTS

| | | | |
|---|---|---|---|
| 3,995,209 | 11/1976 | Weston | 336/DIG. 2 |
| 4,347,472 | 8/1982 | Lemelson | 320/2 |
| 4,543,556 | 9/1985 | Taylor et al. | 336/DIG. 2 |
| 5,216,402 | 6/1993 | Carosa | 336/DIG. 2 |

*Primary Examiner*—Thomas J. Kozma
*Attorney, Agent, or Firm*—Brooks Haidt Haffner & Delahunty

[57] ABSTRACT

An inductive coupler for transferring electrical power from the primary to the secondary is disclosed. A secondary coil assembly having a pair of cores each having a secondary winding is disposed in a case having an opening at one end thereof. The core has a central post projecting from the axial center of a disc-shaped base and an annular skirt projecting from the rim of the base in the same direction, thus forming therebetween an annular groove in which the secondary winding is disposed. As a coil case having a primary winding is inserted between the paired cores and moved further inward of the case, the secondary coil assembly is moved inward of the case. During this movement of the secondary coil assembly, its paired cores are caused to displace toward each other while being guided by pins sliding along guide slits until the cores are mated together thereby to form a magnetic circuit of the inductive coupler. Provisions are also made to retain the secondary coil assembly in the position where the cores are closed and also to urge the secondary coil assembly toward the opening of the case.

12 Claims, 13 Drawing Sheets

INDUCTIVE COUPLER FOR TRANSFERRING ELECTRICAL POWER

BACKGROUND OF THE INVENTION

The present invention relates to an inductive coupler, and more specifically to a separable inductive coupler which is operable by electromagnetic induction to transfer electrical power and is applicable to a system for recharging a battery for electrical powered vehicle, and the like.

There has been known an inductive coupler having a primary coil wound round a primary core and connected to the source of electrical power and a secondary coil wound round a secondary core matable or engageable with the primary counterpart, wherein alternating current applied across the primary winding produces a moving magnetic field which in turn induces a voltage across the secondary winding, thus electrical power being transferred from the primary winding to the secondary winding. The primary and secondary cores may be configured in various shapes, e.g. a channel shape as shown in Publication of unexamined Japanese patent application No. 63-151006 (1988) and coaxial cylindrical shape as described in Publication of unexamined Japanese patent application No. 63-240331 (1988). An E-shaped core is also known which has a central post projecting from the axial center of a disc-shaped base and an annular skirt projecting from the rim of the base in the same direction, thus forming therebetween an annular groove. The E-shaped and coaxial cylindrical shaped cores may also be referred to as "tripod" type due to their three-legged configurations as seen in axial cross section thereof.

In the inductive coupling apparatus having a pair E-shaped primary and secondary cores, each core has a winding disposed in the above annular groove, thus forming a coil assembly, and the two coil assemblies are mated together at the distal or abutment end surfaces of the cores thereby to make a magnetic circuit for transferring electrical power from the primary to the secondary by application of alternating current across the primary winding. For this purposes, either one of the coil assemblies must be brought adjacent to and located properly with respect the other, and then abutted together. When the power transferring has been completed, the above one coil assembly is removed away from the other.

When a higher power is to be transferred by the above inductive coupler, the coil assemblies thereof will inevitably become larger in size and heavier in weight and, therefore, the coil assembly that is carried and moved relative to the other by an operator, e.g. at a battery recharging station, becomes bulky to handle. Frequent operations to install and remove a heavy movable coil assembly with respect to a stationary assembly will apparently require laborious efforts of the operator.

For improvement in the power transferring efficiency of the inductive coupler, i.e. secondary effective power/primary effective power, the cores should be mated at their abutment surfaces with as little core-to-core gap as possible. However, this gap is affected by core vibration caused by application of alternating current across the primary winding of the device. To stabilize the electromagnetic induction of the dived, such vibration should be restricted to minimum

SUMMARY OF THE INVENTION

Therefore, it is an object of the present invention to provide an inductive coupler that can solve the above identified problems.

In accordance with one preferred form of the invention, the apparatus includes a secondary coil assembly having a pair of cores which are disposed one above the other and normally separated away from each other to have a gap therebetween and a secondary winding disposed in each of the cores. Each core is configured to have a central post projecting inward from the axial center of a disk-shaped core base and an annular skirt projecting inward from the rim of the core base and forming with the former center post an annular groove in which the above secondary winding is disposed. The secondary coil assembly is accommodated in a case having an opening in one end thereof through which a primary coil assembly of the inductive coupler is inserted into the above gap between the paired upper and lower cores of the secondary coil assembly. The case is further housed in an outer case having an opening in the end thereof adjacent to the above opening of the first inner case for receiving therethrough the primary coil assembly. The upper and lower cores in the inner case are vertically displaceable toward and away from each other and the inner case is disposed in the outer case movably to and fro with respect to the opening of the outer case.

The primary coil assembly is comprised of a coil case having a handle held by an operator in carrying and moving the assembly, a pair of arms extending from the ends of the handle and a primary winding rigidly supported by the arms. This coil case is insertable into the gap between the cores through the openings of the outer and inner cases. In one aspect of the present invention, the coil case has formed therein a cylindrical space encircled by the primary winding and its diameter is just slightly larger than that of the core center posts so that the latter posts can be fitted closely in the space. In the operative position of the inductive coupler wherein a magnetic circuit is formed with the two cores closed, the distal ends of the peripheral skirt of one core is mated with the associated end of the other core and the center posts inserted from the opposite ends of the above cylindrical space are fitted therein with their abutment surfaces mated together.

According to the invention, the movement of the paired upper and lower cores to insert their center posts into the center space of the coil case is effected by guide means operable in conjunction with the inward movement of the inner case in the outer case with the coil case inserted in place between the cores. The guide means includes guide pins projecting from the cores and slidably engaged with guide slits formed through the outer case. The guide slits are configured such that the movement of the cores, hence of the guide pins, due to the inward movement of the inner case causes the cores to be displaced toward each other as the same cores are moved with the inner case inward until the magnetic circuit of the inductive coupler is formed with the cores set in abutment to each other.

The inductive coupler further includes means for releasably retaining the inner case in the position where the cores are closed forming the magnetic circuit, and means such as spring for urging the inner case 2 toward the opening of the outer case to help open the cores and facilitate removal of the coil case. The apparatus may further includes a cover or a lid which is adapted to open or close the opening of the outer case and means for retaining the cover in its closed position.

In another aspect of the invention, a center core piece is disposed in the region encircled by the primary winding and, accordingly, the center posts of the paired upper and lower cores of the secondary coil assembly are made axially shorter, so that a magnetic circuit of the inductive coupler is formed with center posts mated with the opposite surfaces of the center core piece in the primary winding.

The above and other objects and features of the present invention will become apparent from the following detailed description of preferred embodiments thereof taken in conjunction with the accompanying drawings, which include:

DETAILED DESCRIPTION OF THE EMBODIMENTS

First Embodiment

The following will describe the first embodiment of the inductive coupler according to the present invention while having reference to FIGS. 1 to 9.

Figure 1:
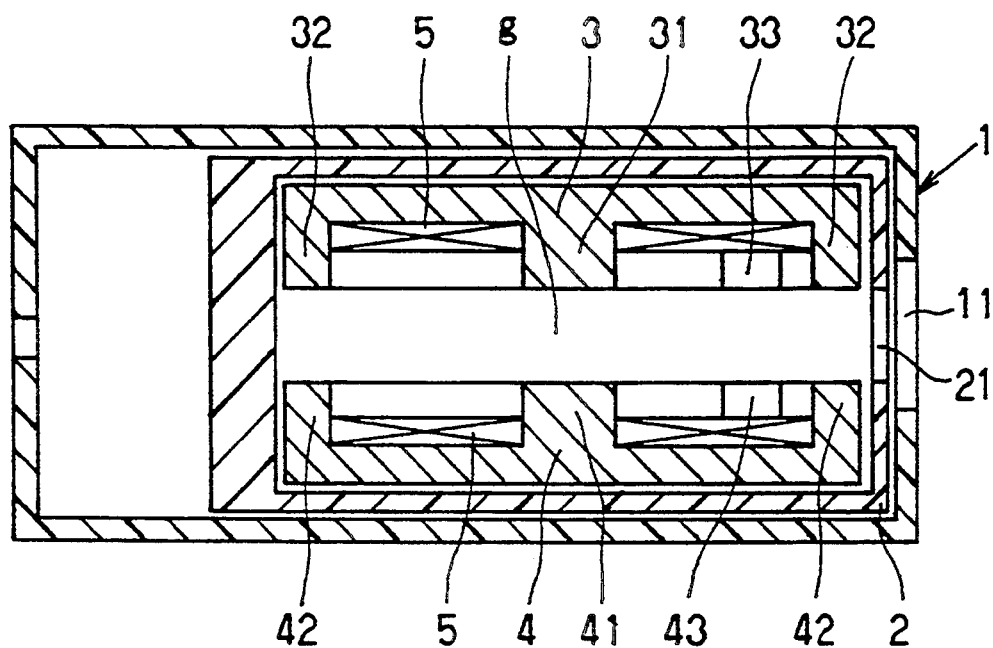
FIG. 1 is a vertical cross-sectional view showing a secondary coil assembly, together with inner and outer cases, of the inductive coupler of first embodiment according to the invention.
Figure 2:
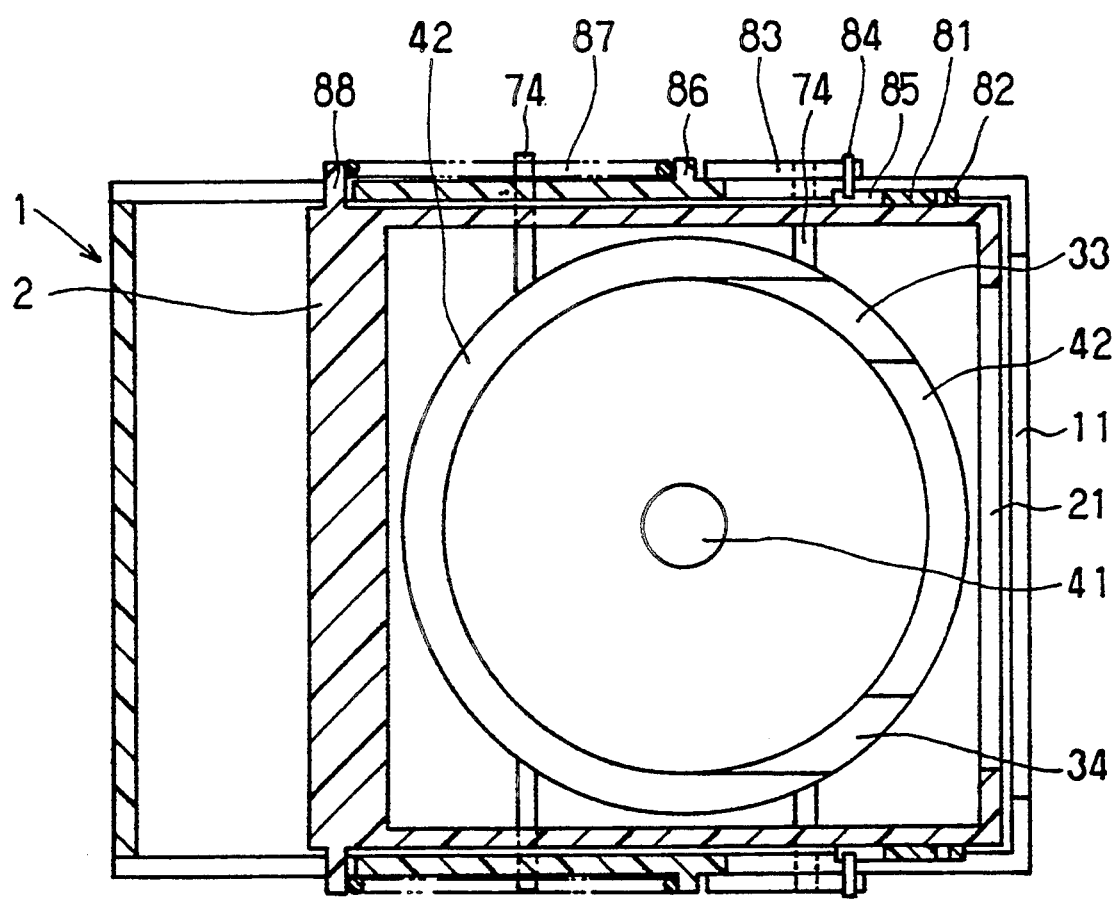
FIG. 2 is a horizontal cross-section of the coil assembly of FIG. 1.

Reference is made firstly to FIGS. 1 and 2 showing a secondary coil assembly of the inductive coupler in vertical and horizontal sections, respectively. The coil assembly includes upper and lower cores 3, 4 of a typical E-shape configuration, each formed with an annular groove defined by a center post 31, 41 and a periphery annular projection or skirt 32, 42 thereof, and a secondary winding 5 disposed in the annular groove. These upper and lower cores 3, 4 with the secondary windings 5, 5 are housed in a movable, square-shaped inner case 2 having formed in the right-hand side end thereof (as seen in FIGS. 1 and 2) an opening 21 through which a primary coil assembly 6, which will be described hereinafter, is passed for insertion and removal thereof. The inner case 2 is further housed in a stationary, square-shaped outer case 1 having an opening 11 formed in the end thereof adjacent the above opening 21 for the same purpose. The upper and lower cores 3, 4 are vertically displaceably disposed within inner case 2, and the latter case 2 is horizontally slidably disposed within the outer case 1. The inner slidable case 2 is normally located at the right extreme position in the outer case 1 with a wide gap g formed between the cores 3, 4, as shown in FIGS. 1 and 2, under the influence of urging means which will be described in detail in later part hereof.

As mentioned earlier, each of the cores 3, 4 is formed with the center post 31, 41 and the peripheral annular skirt 32, 42 to define therebetween the annular groove in which the secondary winding 5 is disposed. The free ends of the center posts 31, 41 and of the annular skirts 32, 42 provide mating or abutment surfaces of the cores 3, 4 in facing relation to each other. As seen clearly in FIG. 1, the mating surface of the center post and that of the peripheral skirt of each core is level with each other and the secondary winding 5 is disposed in the annular groove with its exposed surface recessed away from the above mating surfaces of the core so that an annular cavity is formed between the skirt and the center post. As indicated in FIG. 2, the skirts 32 42 are formed with cuts or straight grooves 33, 44, respectively, for guiding and locating a pair of arms 63 of the primary coil assembly 6.

Figure 3:
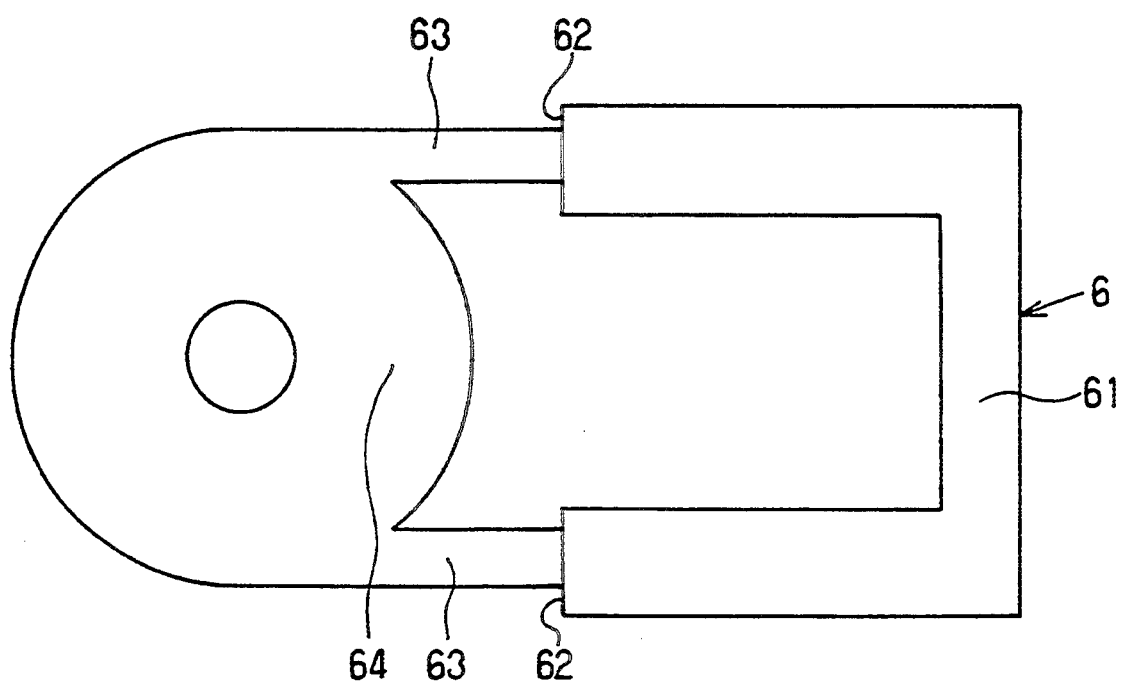
FIG. 3 is a plan view showing a primary coil assembly of the inductive coupler of the first embodiment.
Figure 4:
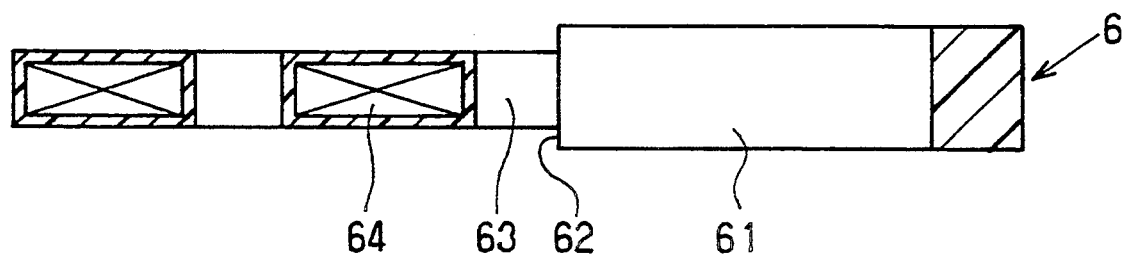
FIG. 4 is a vertical cross-section of the primary coil assembly of FIG. 3.

The primary coil assembly, or a coil case 6, is illustrated in FIGS. 3 and 4 in plan and vertical cross sectional views, respectively, comprising a channel-shaped handle 61 used by an operator to hold the primary coil assembly in moving the same, a pair of arms 63, 63 extending parallel from and rigidly connected to the ends 62 of the handle and a primary winding 64 rigidly supported by the arms 63. As shown in FIGS. 3 and 4, a circular space is defined, surrounded by the winding 64, whose diameter is just slightly larger than that of the center posts 31, 41 of the cores.

Figure 5:
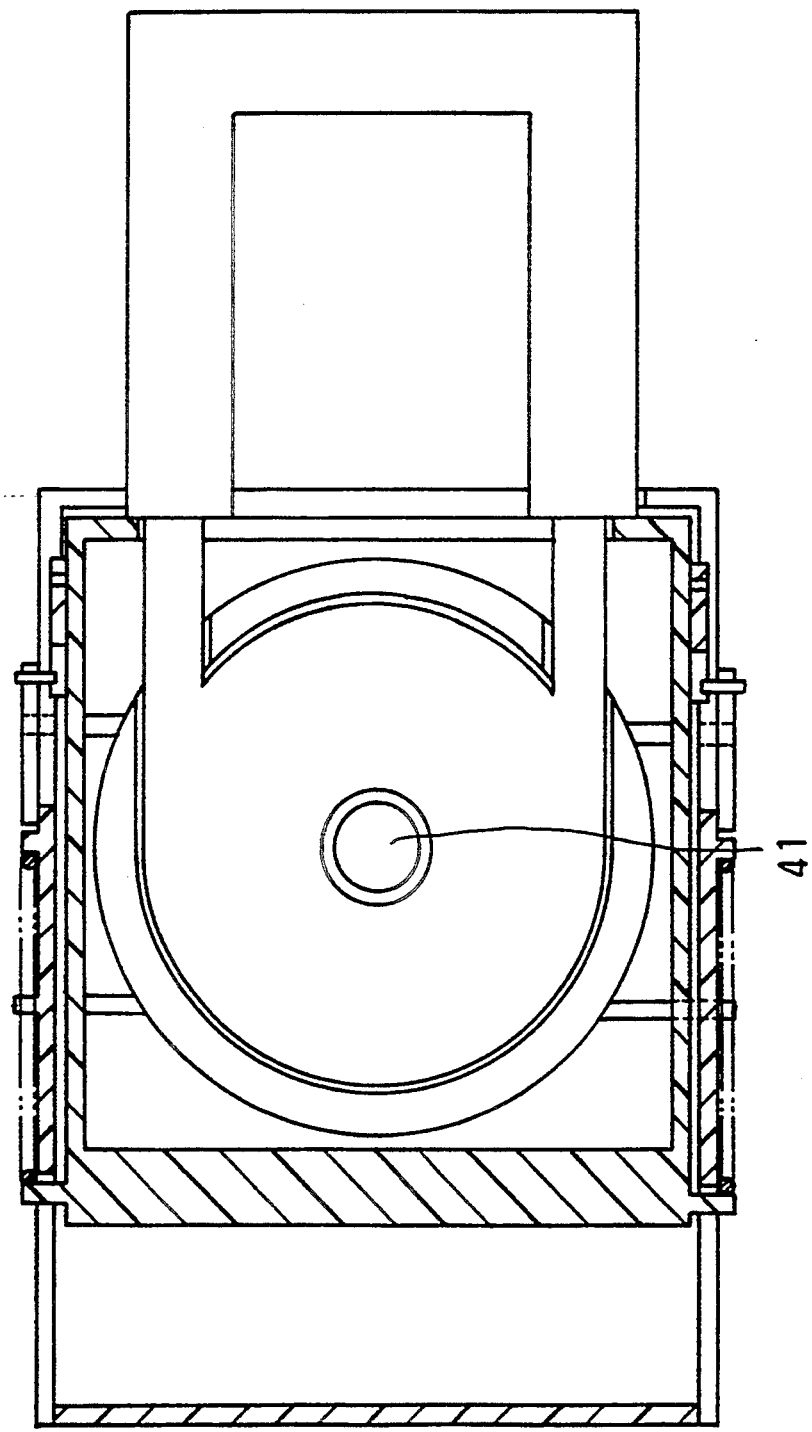
FIG. 5 is a horizontal cross-section of the secondary coil assembly with the primary coil assembly just inserted between cores of the secondary coil assembly.
Figure 6:
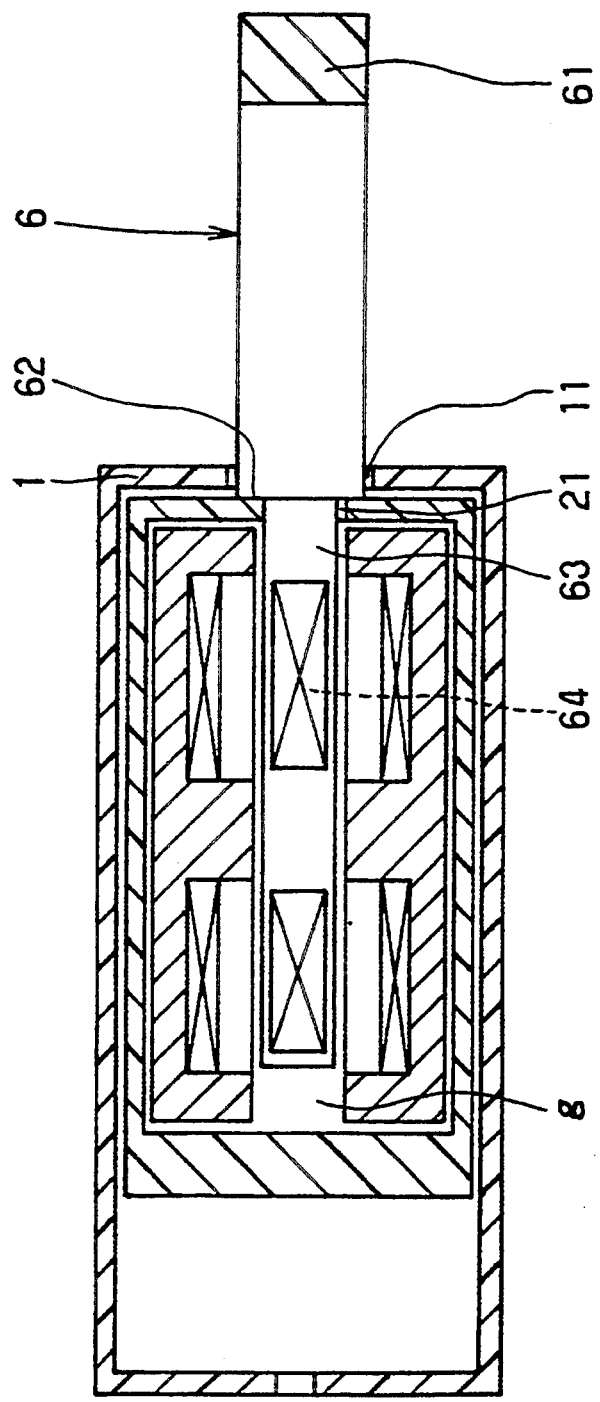
FIG. 6 is a vertical cross-sectional view showing the primary and secondary coil assemblies of FIG. 5.
Figure 7:
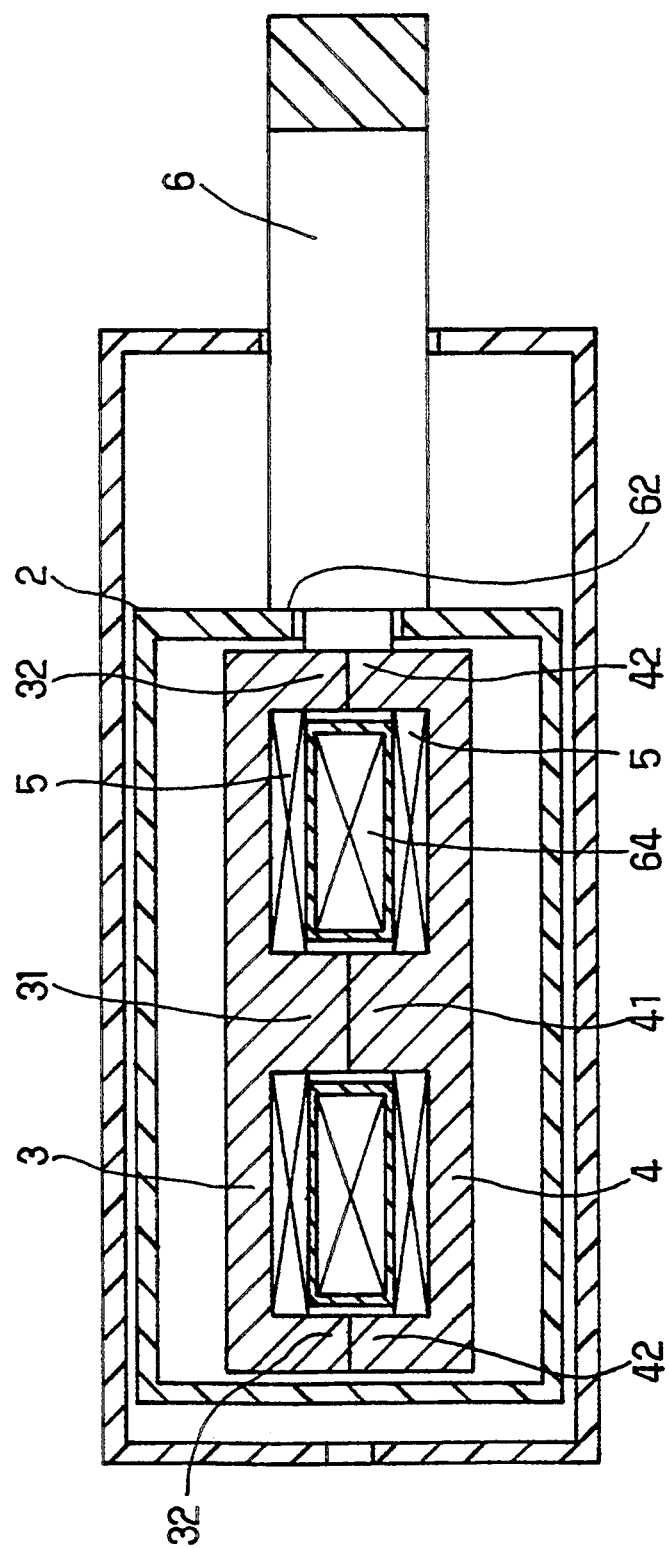
FIG. 7 is a vertical cross-section view similar to FIG. 6, but showing a state where the cores of the secondary coil assembly are closed to form a magnetic circuit of the inductive coupler.

Now referring to FIGS. 5 and 6, these show a state of the inductive coupler when the coil case 6 has just been inserted into the gap g between the cores 3, 4 through the opening 11 of the outer case 1 and the opening 21 of the inner case 2. On the other hand, FIG. 7 shows a state in which the inner case 2, as well as the secondary coil assembly housed therein, has been moved inward of the outer case 1 by the coil case 6 to a position where the cores 3, 4 are closed with the gap therebetween minimized by the action of guide means 7 which will be described hereinafter. In this position of the cores 3, 4, the center posts 31, 41 are fitted in the center hole of the primary winding 64 with the abutment surfaces thereof, as well as the abutment surfaces of the skirts 32, 42, mated with one another, thus forming a magnetic circuit for the inductive coupling apparatus.

Figure 8:
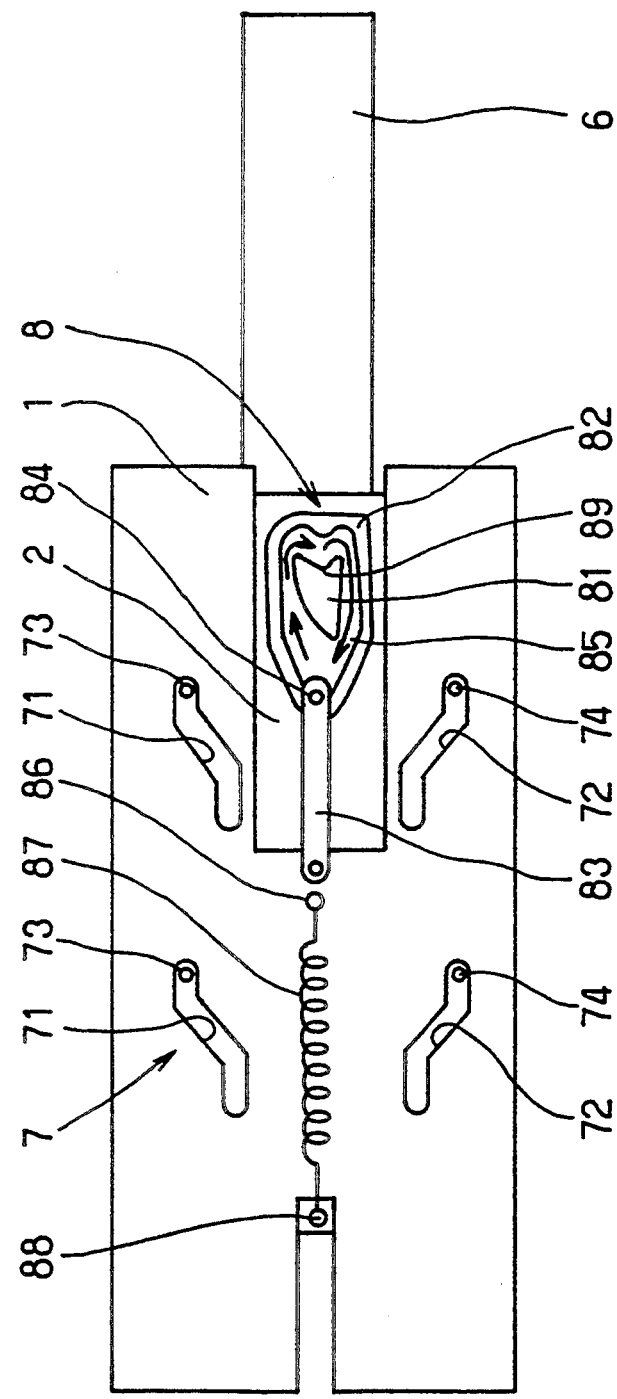
FIG. 8 is a side view of the inductive coupler of the first embodiment, showing the state corresponding to that of FIGS. 5 and 6, as well as relevant means of the device.
Figure 9:
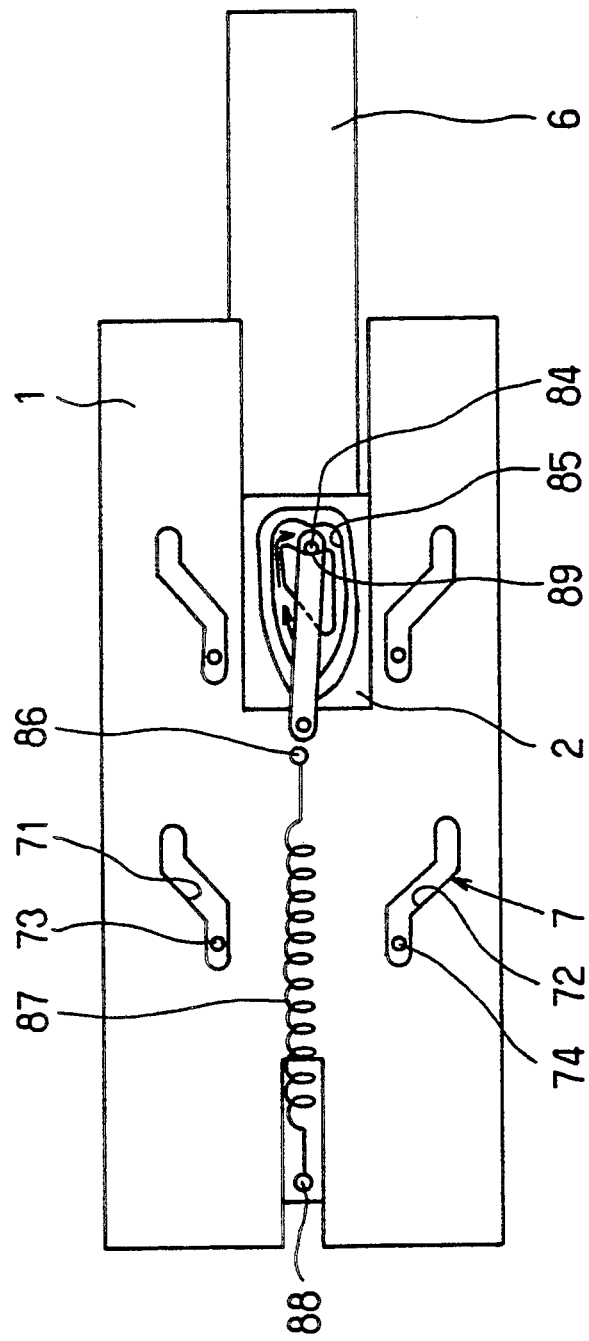
FIG. 9 is a side view similar to FIG. 8, but showing the state corresponding to FIG. 7.

The following will explain the above referred to guide means 7, as well as retaining means and urging means of the inductive coupler, while having reference specifically to FIGS. 2, 5, 8 and 9. It is to be noted that FIGS. 8 and 9 show only one counterpart of the above-named means on one lateral side of the apparatus, but the same arrangement is provided on the opposite side as indicated in FIGS. 2 and 5.

Referring to the drawings, each side wall of the stationary outer case 1 is formed therethrough a pair of upper guide slits 71, 71 slidably receiving guide pins 73, 73 which project outward from the adjacent lateral side wall of the upper core 3, and another pair of lower guide slits 72, 72 similarly receiving guide pins 74, 74 projecting outward from the adjacent side wall of the lower core 4. As illustrated in FIGS. 8 and 9, each of the guide slits 71, 72 has short horizontal sections at opposite ends and a relatively long intermediate section in connection with the horizontal sections. The intermediate sections of the respective guide slits 72, 73 are inclined in such a way that the leftward movement of the guide pins 73, 74, as seen in the drawings, and hence of the upper and lower cores 3, 4 carried thereby, effected by the coil case 6 pushing the inner case 2 inward of the outer case 1, causes the upper and lower cores to be displaced toward each other as the same cores are moved with the inner case inward. The upper and lower cores 3, 4 are mated together to close a magnetic circuit of the inductive coupler at the left end of the inclined intermediate sections of the slits, i.e. at the horizontal sections remote from the opening 11, 21 of the two cases. In this closed position of the cores, the center posts 31, 41 are fitted snugly in the center hole of the primary winding 64 with the end surfaces thereof in tight abutment to each other. To make it possible for the guide pins 73, 74 to move relative to the guide slits 71, 72, the inner case 2 is formed in its opposite side walls with appropriate slits or openings (not shown).

The inductive coupler further includes the retaining means, which is generally designated by reference numeral 8, for retaining the inner case 2 in the position of FIG. 7 where the cores 3, 4 are closed forming the magnetic circuit. As shown in FIGS. 8 and 9, the retainer 8 has a somewhat heart-like shaped projection 81 formed on each side wall of the movable inner case 2 and a somewhat oval shaped projection 82 formed encircling the former projection 81 thereby to define an endless guide passage or groove 85, as indicated by three arrows. The inner projection 81 has a recessed portion 89 for catching a pin 84, which will be to be described hereinafter, and is shaped so as to allow the pin 84 to follow the guide groove 85 in one direction as indicated by the arrows. There is provided an arm 83 one end of which is pivotally connected to the outer case 1 and the other end of which has the pin 84 that is freely rotatable pin 84 and having a head disposed in the guide groove 85.

As the urging means, there is provided a coil spring 87 hooked by and between a pin 86 on the stationary outer case 1 and a pin 88 on the movable inner case 2, so that the inner case 2 is urged toward the opening 11 of the outer case 1.

The above-described means 7, 8 and 87 operate as follows. When the coil case 6 is yet to be inserted, the inner case 2 is normally held at the right extreme position in the outer case 1, as shown in FIGS. 1 and 2, due to the urging action of the spring 87, so that the cores 3, 4 are separated with the guide pins 73, 74 thereof located at the respective right end positions in the guide slits 71, 72 as shown in FIG. 8, and with the gap g formed between the cores. In this position of the inner case 2, the guide pin 84 on the arm 83 is placed at a position in the guide groove 85 that is furthest from the opening 11 of the case 1, as shown in FIG. 8.

As the coil case 6 is inserted into the gap g through the openings 11, 21 and then pushed further, the inner case 2 is forced inward of the outer case 1 together with the cores 3, 4, which are then moved linearly for a short distance corresponding to the first horizontal sections of the slits 71, 72 and subsequently displaced toward each other by the guidance of the guide pins 73, 74 sliding along the intermediate inclined sections of the slits. With the guide pins 73, 74 moved to the end of the slits 71, 72, the center posts 31 have been inserted in the center hole of the primary winding 64 and the cores 3, 4 are mated together, as shown in FIG. 7, thus forming a closed magnetic circuit ready for the electromagnetic induction. It is noted that the above inward movement of the inner case 2 takes place with the spring 87 being expanded progressively.

During the inward movement of the inner case 2, the pin 84 on the arm 83 follows the upper path of the guide groove 85, and it can be caught by the heart-shaped projection 81 at its latching recess 89, as shown in FIG. 9, by fully pushing the inner case 2 inward until the guide pin 73, 74 reaches the ends of the respective guide slits 71, 72 and then releasing the coil case 6. As such, the inner case 2 can be held at position in the outer case 1 where the cores 3, 4 are completely closed, as shown in FIG. 7. With an alternating current flown in the primary winding 64, a voltage is induced across the secondary winding 5, whereby electrical power is transferred from the primary to the secondary by electromagnetic induction.

In releasing the engagement of the pin 84 from the recess 89, the coil case 6 is merely pushed by the operator. By do doing, the pin 84 is released, moving relatively to the inner case 2 while following the lower path of the guide groove 85 as the inner case 2 is pulled back toward the opening 11 of the outer case 1 by the tension of the coil spring 87. Accordingly, the inner case 2 is returned to its original position, with the cores 3, 4 wide opened and the guide pins 73, 74 returned to the right extreme positions in the respective guide slits 71, 72. Because the cores 3, 4 can be thus moved smoothly away from the coil case 6, providing very little resistance thereto, the coil case can be withdrawn by the operator only with a little effort.

It is to be noted that, although the winding 64 and the windings 5 in the above-described embodiment provide the primary and the secondary of the inductive coupler, respectively, these windings may be reversed in terms of the direction of power transferring.

Second Embodiment

Figure 10:
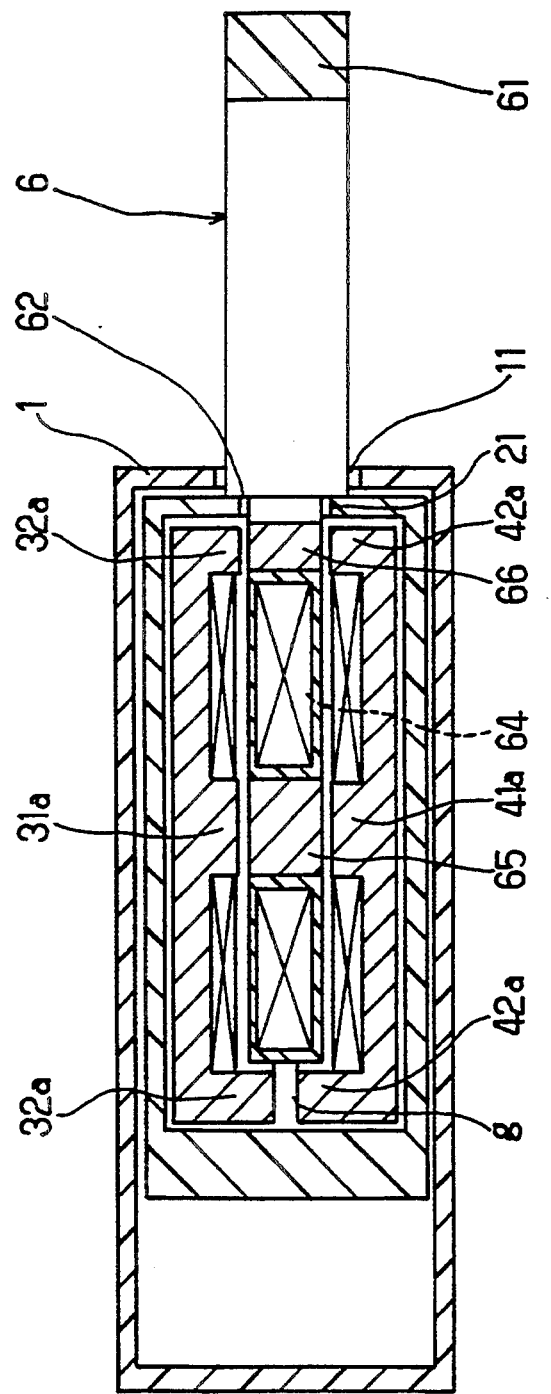
FIG. 10 is a vertical cross-section of an inductive coupler of second embodiment according to the invention.

Second embodiment of the inductive coupling apparatus shown in FIG. 10 differs from the first embodiment in that a center core piece 65 is disposed in the region encircled by the primary winding 64 and, accordingly, the center posts 31a, 41a of the cores 3, 4 are made axially shorter or level with the surface of the secondary windings 5, so that a magnetic circuit of the inductive coupler is formed with center posts mated with the opposite surfaces of the center core piece 65. In addition, another core piece 66 is inserted between the arms 63 of the coil case 6 and, accordingly, the skirts 32, 42 of the upper and lower cores are formed with cuts in which the core piece 66 is received when the cores are closed. This embodiment can offer an advantage in that the distance for which the cores 3, 4 should be displaced vertically to close or open the magnetic circuit can be shortened and, therefore, the distance that the inner case 2 should move horizontally can be reduced, too. It is noted that addition of these two core pieces 65, 66 will not increase the weight of the coil case 6 to such a noticeable extent that demands extra effort by operator.

Third Embodiment

Figure 11:
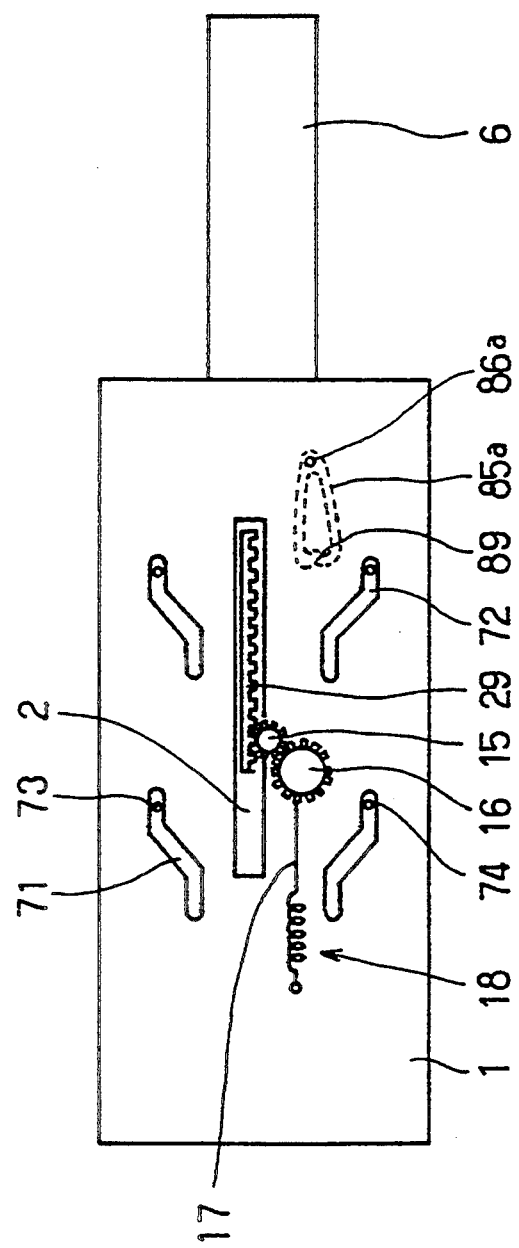
FIG. 11 is a side view of an inductive coupler of third embodiment according to the invention.
Figure 12:
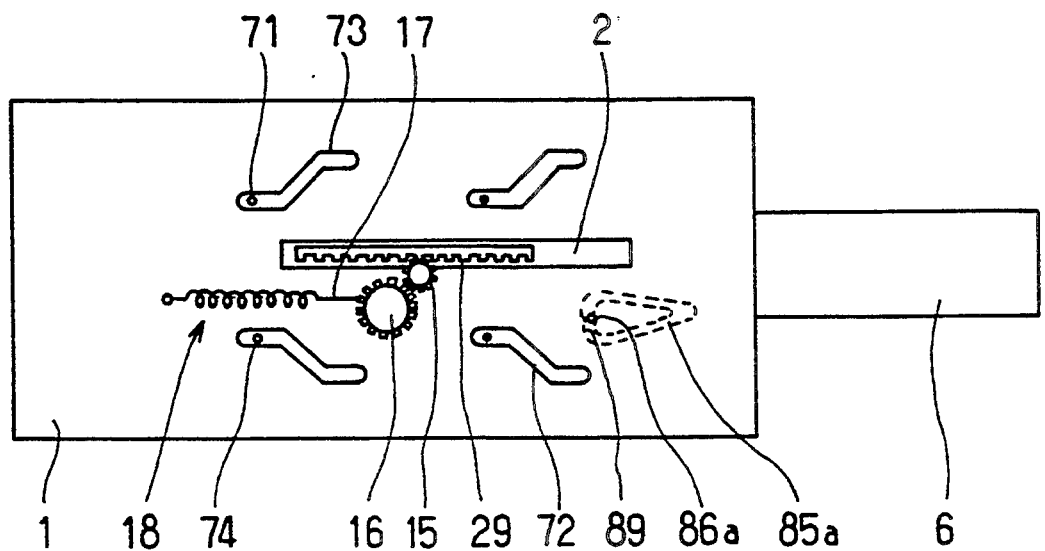
FIG. 12 is a side view similar to FIG. 11, but showing a different state.

The third embodiment shown in FIGS. 11 and 12 differs most from the first embodiment in that the urging means or the coil spring 87 is substituted by a toothed rack 29 fixed on each lateral side wall of the inner case 2, a pair of engaged toothed wheels or gears 15, 16 one of which (or 15) is meshed with the rack 29, and a string 17 one end of which is wound round the shaft (not shown) of the gear 16 and the other end of which is connected to the lateral side wall of the outer case 1 by way of a coil spring 18. The guide groove 85 and the pin 84 of the retaining means 8 in the first embodiment is replaced with a guide groove 85a formed in the inner surface of the lateral side wall of the outer case 1 and a pin 86a projecting from the inner case 2 and engaged with the groove. In this retaining means, because the guide groove 85a is formed in the stationary outer case 1 while the pin 86a is provided on the movable inner case 2, the heart shape of the guide groove 85a is reversely oriented with respect to the guide passage 85, although the retaining means itself performs the same function as its counterpart of the first embodiment. The guide means comprising the guide slits 71, 72 and the pins 73, 74 is substantially the same as the counterpart of the first embodiment. The urging means operates in the manner as described below.

FIG. 11 shows a state in which the coil case 6 is inserted between the cores 3, 4 (not shown). As the coil case 6 is pushed, the inner case 2 is forced inward, accordingly, and the rack 29 moving with the inner case 2 causes the gear 15 to rotate in counter-clockwise direction (as viewed in the drawing) and hence the gear 16 in clockwise direction. As such, the coil spring 18 is pulled by the string 17 which is then being wound round the shaft of the rotating gear 16. The spring 18 is thus expanded, as shown in FIG. 12, when the inner case 2 is moved to its left extreme position with the pin 86a then held by the recess 89 of the guide groove 85a. With the pin 86a released from the recess 89, the inner case 2 is pulled back together with the coil case 6 to their original positions under the influence of the tension of the coil spring 18.

Figure 13:
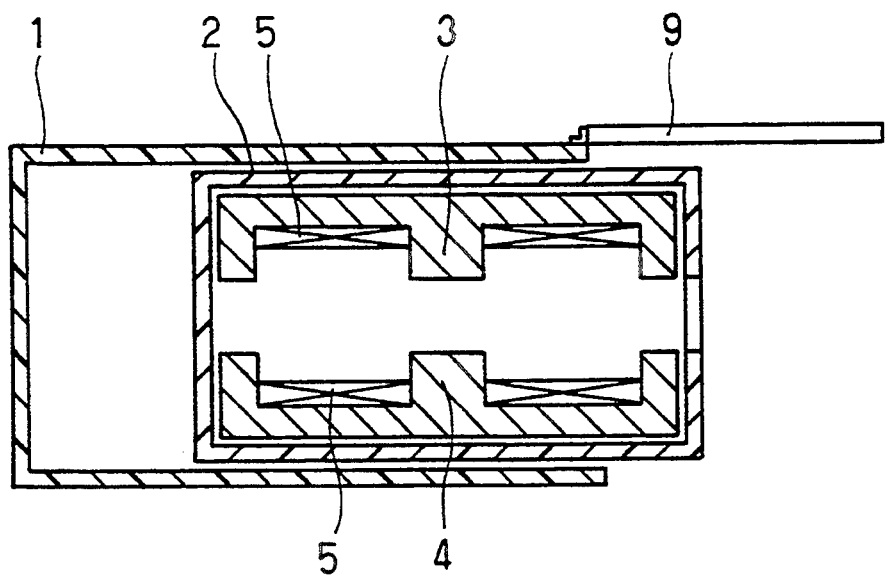
FIG. 13 is a vertical cross-section of an inductive coupler of fourth embodiment according to the invention.
Figure 14:
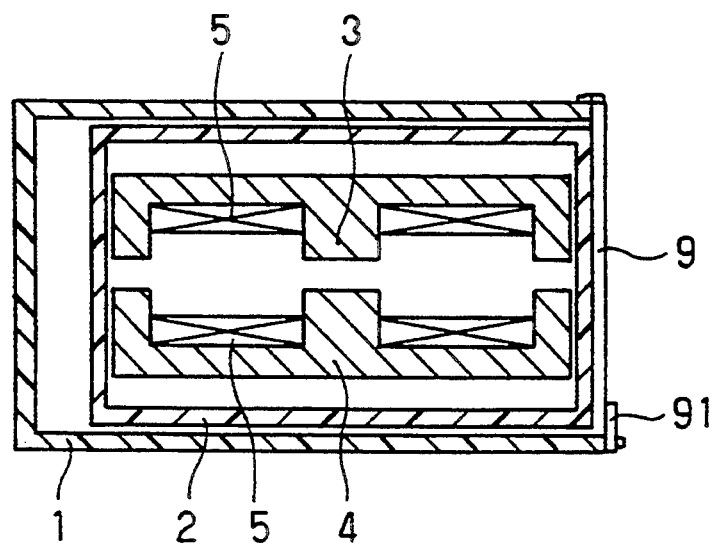
FIG. 14 is a vertical cross-section similar to FIG. 13, but showing a different state.

Fourth Embodiment:

Referring to FIGS. 13 and 14 showing the fourth embodiment, the inductive coupler of this embodiment differs from the first embodiment in that the outer case 1 is fully opened on the side thereof from which the coil case 6 is inserted and, instead, has a lid or a cover 9 which is hinged at the top edge of the case as shown in FIG. 13 so as to open or close the outer case 1 as required. Additionally, at the bottom edge of the case is provided a retainer 91 for holding the cover in its closed position. In this embodiment, swinging the cover 9 open provides an access to the opening 21 of the inner case 2 for insertion of the coil case 6. After the coil case 6 has been taken out of the case, hence when the inductive coupler is not in service, the cover 9 may be placed in its closed position to prevent ingress of any foreign matters into the apparatus. By so arranging the outer case 1, the inner case 2 may be housed completely within the outer case, as shown in FIG. 14, with the result that the inductive coupling apparatus when not in use can become smaller in size.

While the invention has been described with reference to the specific embodiments, it is to be understood that the present invention can be practiced in other changes and modifications without departing from the spirit or scope thereof.

What is claimed is:

1. An inductive coupler comprising:
    a first coil assembly having a pair of cores and a first winding disposed in at least one of said cores;
    a case housing therein said first coil assembly and having an opening at one end thereof, said first coil assembly being movable toward and away from said opening and said cores being movable toward and away from each other in said case;
    a second coil assembly having a second winding and insertable between said cores of the first coil assembly through said opening of the case;
    guide means for causing said cores of the first coil assembly to move toward each other as said second coil assembly inserted between the cores is moved to push the first coil assembly in the case until a magnetic circuit of said inductive coupler is formed.

2. An inductive coupler according to claim 1, wherein said second coil assembly includes a coil case supporting said second winding, said coil case being adapted to be insertable between said cores through said opening and to cause said first coil assembly to move in said case away from said opening thereof.

3. An inductive coupler according to claim 2, further comprising means for guiding said coil case when the coil case is being inserted between said cores and also locating the coil case with respect to said first coil assembly when the coil case has been inserted between the cores.

4. An inductive coupler according to claim is wherein each of said cores has a central post projecting inward from the axial center of a core base and an annular skirt projecting inward from the rim of said base and forming with said center post an annular groove in which said first winding is disposed, and said coil case has an opening defined by said second winding for receiving therein said central posts of the cores, said magnetic circuit being formed with said paired cored mated together at said center posts and peripheral skirts thereof.

5. An inductive coupler according to claim 4, said guide means being operable to move said paired cores toward each other such that said center posts of the cores are inserted and fitted in said opening of the coil case.

6. An inductive coupler according to claim 1, wherein each of said cores has a central post projecting inward from the axial center of a core base and an annular skirt projecting inward from the rim of said base and forming with said center post an annular groove in which said first winding is disposed, and said coil case has a core piece in the region encircled by said second winding, said magnetic circuit being formed with said paired cores mated together with the opposite surfaces of said core piece of the coil case.

7. An inductive coupler according to claim 6, said guide means being operable to move said paired cores toward each other such that said paired cores are mated together with the opposite surfaces of said core piece of the coil case.

8. An inductive coupler according to claim 4, further comprising means for releasably retaining said first coil assembly in the state where said magnetic circuit is formed, and means for urging said first coil assembly toward said opening of the case.

9. An inductive coupler according to claim 1, wherein said first coil assembly provides the primary and said second coil assembly provides the secondary of said inductive coupler, respectively.

10. An inductive coupler according to claim 1, wherein said first coil assembly provides the secondary and said second coil assembly provides the primary of said inductive coupler, respectively.

11. An inductive coupler according to claim 1, further comprising a cover adapted to open and close said opening of the case and means for holding said cover in its closed position.

12. An inductive coupler according to claim 6, further comprising means for releasably retaining said first coil assembly in the state where said magnetic circuit is formed, and means for urging said first coil assembly toward said opening of the case.

* * * * *

UNITED STATES PATENT AND TRADEMARK OFFICE
CERTIFICATE OF CORRECTION

PATENT NO. : 5,379,021
DATED : January 3, 1995
INVENTOR(S) : M. Ito et al

It is certified that error appears in the above-indentified patent and that said Letters Patent is hereby corrected as shown below:

Column 8, line 39, after "claim" insert --1,--.

Signed and Sealed this

Twenty-third Day of May, 1995

Attest:

BRUCE LEHMAN

Attesting Officer

Commissioner of Patents and Trademarks